Figure 1:
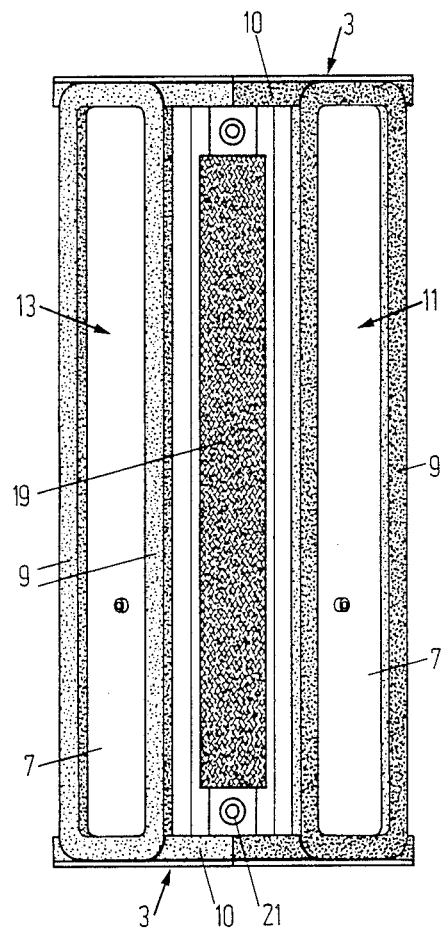

United States Patent [19]

Schnorrer

[11] Patent Number: 4,956,537
[45] Date of Patent: Sep. 11, 1990

[54] METHOD FOR HINDGAS COVERAGE IN ARC WELDING AND HINDGAS DEVICE FOR CARRYING-OUT THE METHOD

[76] Inventor: Walter Schnorrer, Ryesgade 40, Aalborg, Denmark

[21] Appl. No.: 369,658

[22] Filed: Jun. 21, 1989

[30] Foreign Application Priority Data

Jun. 23, 1988 [DK] Denmark ............................. 3472/88
Apr. 24, 1989 [DK] Denmark ............................. 1957/89

[51] Int. Cl.$^5$ ............................................. B23K 9/16
[52] U.S. Cl. ..................................... 219/74; 219/136
[58] Field of Search ............................. 219/74, 72, 136

[56] References Cited

U.S. PATENT DOCUMENTS 3,450,857 6/1969 Webb ..................................... 219/74

FOREIGN PATENT DOCUMENTS 881561 7/1953 Fed. Rep. of Germany .
3103941 1/1983 Fed. Rep. of Germany .
227366 9/1985 German Democratic Rep. .

Primary Examiner—Clifford C. Shaw
Attorney, Agent, or Firm—Lee, Mann, Smith, McWilliams & Sweeney

[57] ABSTRACT

A hindgas implement for protective gas coverage of the root of a welded seam that may be fixed to work pieces to be welded by means of vacuum chambers (11, 13) that are emptied of air via pipe branches (25). After that protective gas is fed to the root of the welded seam via a diffusor (19) and is withdrawn via outlets (21, 23). By means of this, hindgas coverage can also be achieved in welding together of major, extensive work pieces made up of plate as there is no dependence on free edges on which to clamp the hindgas device.

32 Claims, 7 Drawing Sheets

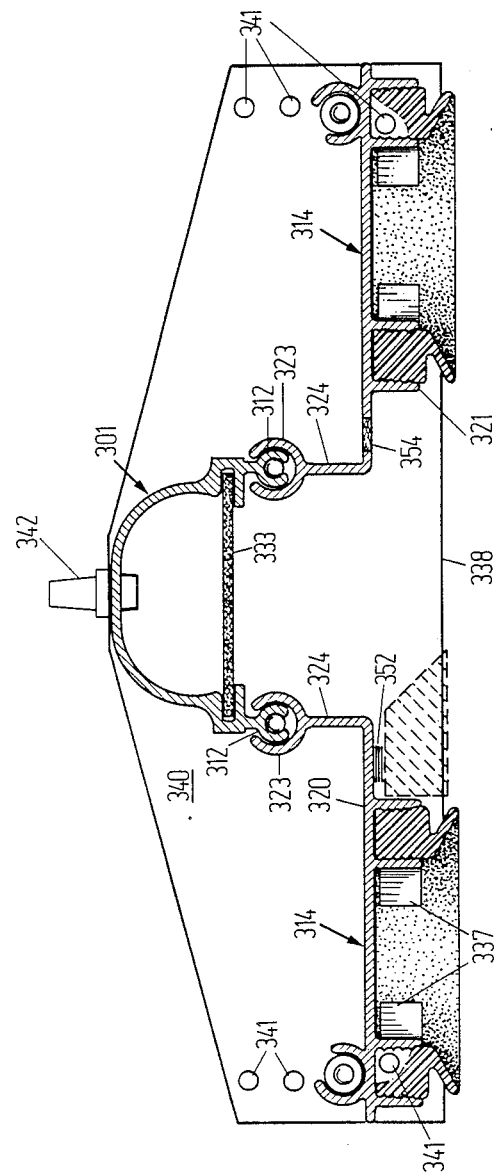

METHOD FOR HINDGAS COVERAGE IN ARC WELDING AND HINDGAS DEVICE FOR CARRYING-OUT THE METHOD

The invention relates to a method for hindgas coverage in arc welding in which the root of a welded seam is isolated from atmospheric air by placing a hindgas device on the side of the root which device is having walls that together with the surface of the work piece to be welded or the work pieces to be welded form a substantially closed space enclosing the root of the welded seam and in which a protective gas is conducted through the space during the welding process.

Furthermore the invention relates to a hindqas device for use in the carrying-out of the method by means of which a space can be formed over the root of the welded seam the device comprising walls that may bear against one or more work pieces to be welded and having feed openings for protective gas.

Such a method and hindgas device are disclosed i.a. in the specification to DE patent no. 881.561. A vessel is placed over the welded joint on the side of the root. The vessel is bearing with seals against the surface of the work piece to be welded so that a nearly closed space is formed. During welding - typically a TIG-welding or GTAW-Welding of non-ferrous metals and stainless steel - protective gas, e.g. argon gas or a nitrogen based gas mixture (in German: Formiergas, consisting of approximately 90 percent of nitrogen and approximately 10 percent of hydrogen), is fed to the space under an excess pressure, the protective gas thereby displacing the atmospheric air in the space. The air and the protective gas leave the space through the welded joint and the leaks that might be present otherwise. It does not appear from the above patent specification how the vessel is fixed to the work piece to be welded.

From another quarter a technique of a similar kind is known by which the vessel is fixed to the work piece to be welded by means of clamping tongs. This is not possible if it is a question of ends of pipes to be welded together, or if it is a question of major work pieces whether it is a question of parts made up of plate or of quadrangular and cylindrical vessels as there are no free edges to grasp around. Owing to the magnetic properties of the materials it is practically not possible to use magnetic retainers either for the vessel.

The alternative to welding of stainless plates - plate being used hereinabove, here and hereinafter as a designation covering plate as well as sheet - has hitherto been that the root of the welded seam was ground in order to remove the oxidized layer. Grinding is an effective but expensive method i.a. because there will always be a requirement for a certain fineness of the ground surface. Moreover, it is not possible to grind sharp inside corners in for example vessels effectively with grinding tools.

These disadvantages can be avoided when talking of pipes or tubes of an inside diameter of up to 500 millimeters by using another embodiment of prior art that is described in "Svejsning af rustfast stal med gasdaekning pa bagsiden"(Welding of Stainless Steel With Gas Coverage on the Rear Side) by Palle Aastrup and Per Arp, a publication from The Danish Welding Institute, Glostrup, Denmark, published 1984. In this case, two sealing disks connected by means of a rod and in the disks are applied, the disks and/or rod being furnished with feed openings and withdrawal openings for protective gas. The disks are made of an elastic material and are firmly fixed under compression by means of an annular elastic sealing means within the pipe or tube. The disks are placed on both sides of the point of weld and through the space closed in this way protective gas is flushed.

On welding major dimensions of pipe or tube the equipment becomes expensive to manufacture, inconvenient to use and considerable amounts of protective gas are required in the process. Therefore a chamber segment may be used, this chamber segment also being described in the last mentioned publication, and in which chamber segment a part of the arch of the joint may be covered by means of hindgas. The chamber segment is fixed by means of a rod that stretches from the segment to the opposite internal side of the pipe or tube. However, on account of the air tight bearing against the pipe or tube it is necessary to have a chamber segment having the same radius as the diameter of the pipe or tube to be covered by means of hindgas.

The object of the invention is to provide a method and a hindgas device of the kind indicated in the introductory part by means of which it is possible to bring about hindgas coverage of major, more extensive work pieces to be welded or in a simpler way than by the prior art. Other objects are to indicate a method in which a hindgas device can be attached tightly fitting to the work pieces to be welded, these work pieces being of widelY different shape and of different materials.

This is achieved by a method of the above mentioned kind that is characterized in that the hindgas device is held against the work piece to be welded by creating a vacuum in one or more other chambers in the hindgas device which chambers are having a surface of the work piece to be welded for one side and the walls of the chamber for the other sides.

By the method according to the invention there is whence made use of a sub-pressure in order to keep the walls of the gas tight space bearing against the work pieces to be welded, creating the possibility of using hindgas in the case of work pieces of great extension and without dependence on their magnetic properties.

The hindgas device according to the invention is characterized in that the walls of the device are connected to at least one chamber having means permitting connection to a source of vacuum, said chamber being provided with sealing means that may bear against the surface of work piece to be welded. The hindgas device according to the invention permits a number of solutions as stated in the the dependent claims being advantegeous with respect to technical applicability, flexibility and low production costs as compared to prior art.

By designing the hindgas device as dealt with in claim 3 where two chambers, one on each side, are situated along the space for flow of protective gas and where the sealing means for each chamber are placed on the inside of the walls of the chamber, the edges of said walls being suited for guiding the work pieces facing the edges it is possible to use the apparatus as a fixture during the process of welding as the edges of the walls of the chamber guide the work pieces that are to be welded together. Depending on the embodiments of the device two plate-shaped pieces of work may be guided to being welded together under different angles.

The device may be designed as stated in claim 4, where the space for the flow of protective gas and the chamber provided with sealing means have a common abutting surface intended for the work pieces to be welded. The abutting surface has the shape of a plane, and in conjunction with the space's end there is provided another space for a flow of protective gas having separate sealing means that join the first sealing means. The other space with its sealing means has a second surface intended to abut a work piece has its second abuttinq surface at an angle with respect to the first abutting surface. It will then be possible to cover a welded seam by hindgas, even when the welded seam extends all the way up to a wall placed at an angle with respect to the welded seam. Typically this is the case when speaking of inside corners of vessels and containers.

It is preferred that the device has a web comprising at least a first part intended for use as a vacuum chamber and a second part intended for a flow of protective gas, which first and second parts are mutually connected along facing lateral edges. A kind of modular system is then achieved whereby several embodiments may be produced using only a few different basic parts as well as the holding in stock of different devices and parts maY be minimized.

When the hindgas device is designed as dealt with in claim 6 where the mutual connection between the first and the second part in the web comprises an in part cylindrical hollow provided with a slit and an in part cylindrical outer surface on each part respectively and of substantially the same cylinder diameter where the cylinder axes of the hollow and the outer surface extend in parallel with the lateral edges, the first and second parts including their mutual assembly may be made of extruded parts, the assembly being done by inserting the outer cylinder surface into the hollow. This assembly makes it also possible by suitable dimensioning of the slit to allow a certain angular motion between the first and the second part for adaptation of the hindgas device for bearing against not coplanar surfaces.

By means of the measures dealt with in claim 7 where the first part is provided with a in part cylindrical hollow along each of two of its lateral edges, the slits of the hollows facing in different directions, the possibility of making hindgas devices for use at least by two different angles between the work pieces to be welded is created, e.g. a plane assembly and an assembly at a right angle between the plane plates In order to be able to use the invention in welding major Work pieces to be welded having singly curved or doubly curved surfaces, e.g. in welding end pieces on cylindrical tanks the device is preferably designed as dealt with in claim 8, i.e. comprises an elongated piece of plate provided with waves running in parallel across its longitudinal axis and furnished with an arch extending in the longitudinal direction of the piece. The arch extends away from the side of the device intended for bearing against the work piece to be welded. Below the arch the space intended for flow of protective gas is provided, the non-arching part of the piece of plate is provided with one or more vacuum chambers placed in succession of each other along the longitudinal axis of the device. According to this embodiment of the invention the device may be designed as a long band with one or more spaces for protective gas flow arranged between vacuum chambers on the underside. Thereby is attained such a mecanichal flexibility that the device according to the invention may be fixed by its vacuum chambers on the side of the shell for a cylindrical container or a large pipe It will then be possible to weld from the other side and simultaneously achieve hindgas coverage of the root of the the seam.

The hindgas device is preferably worked out as dealt with in claim 9, where the space intended for flow of protective gas is provided with a diffusor consisting of one or more diffusor members through which the protective gas may be forced when feeding protective gas to root of the welding seam, which diffusor extends substantially over the whole length of the device.

A diffusor member may consist of a porous element extending across the space intended for flow of protective gas. The piece of material may be stiff or rigid or flexible according to for which version of the hindgas device it is to be used.

An other diffusor member for use in the hindgas device may consist of a hose-like duct made up of spirally wound metal strips. This form is especially suited for the flexible version of the hindgas device.

Figure 2:
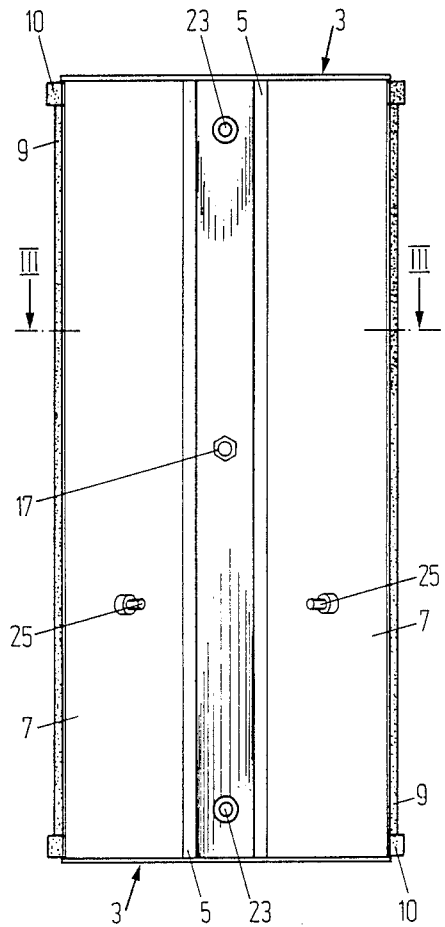
Figure 3:
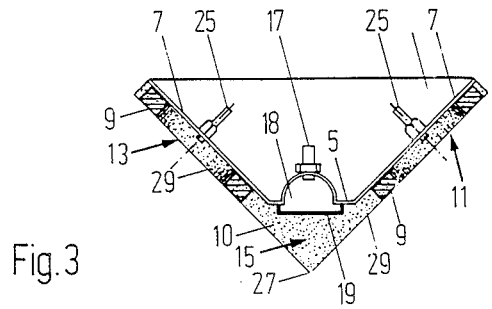
Figure 4:
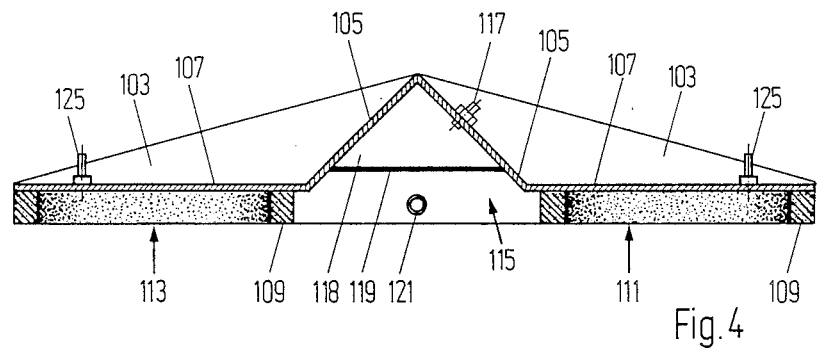
Figure 5:
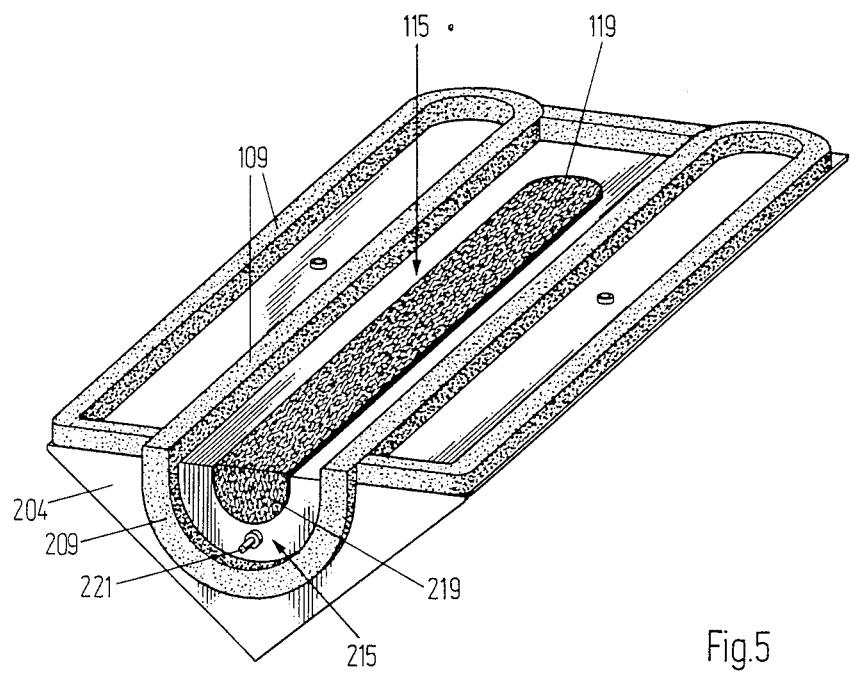
Figure 6:
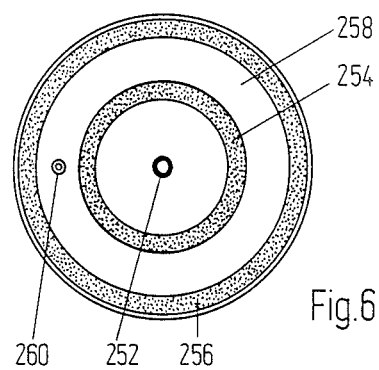
Figure 7:
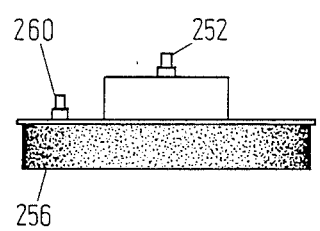
Figure 8:
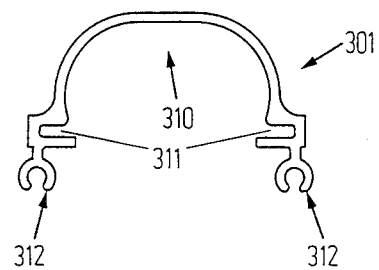
Figure 9:
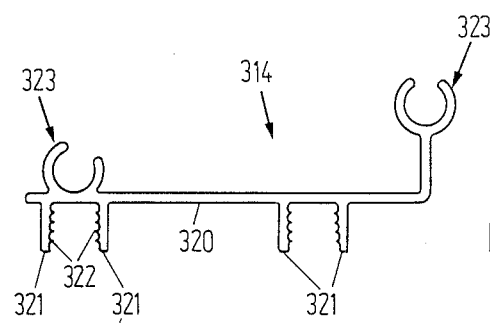
Figure 10:
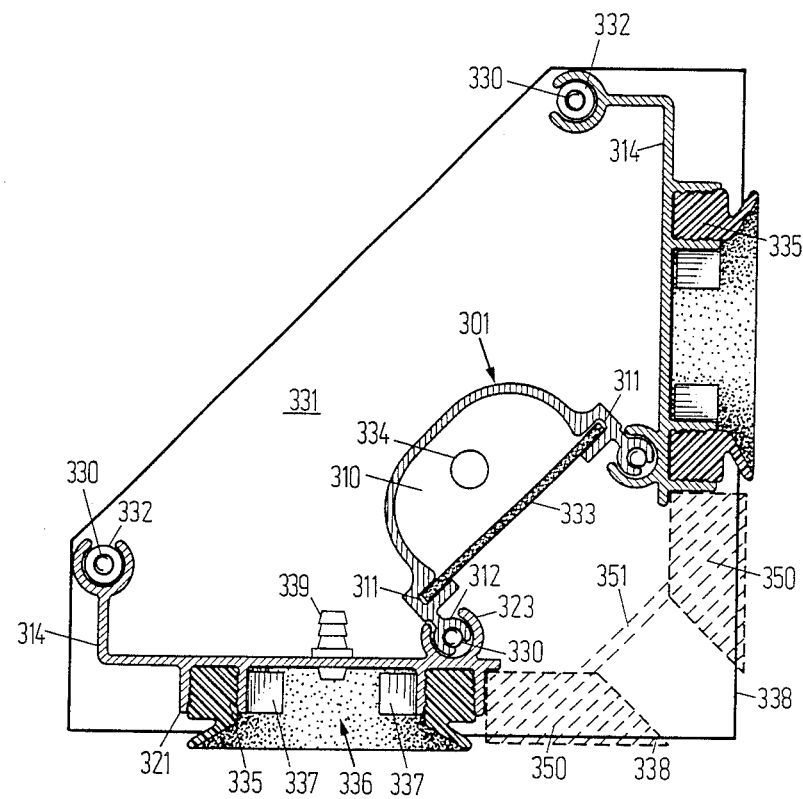
Figure 12:
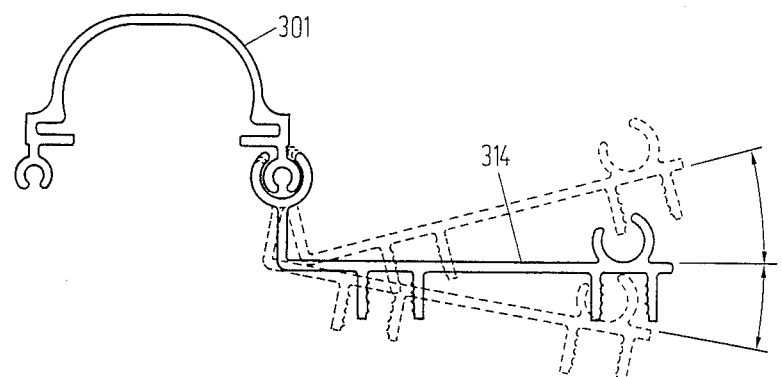
Figure 13:
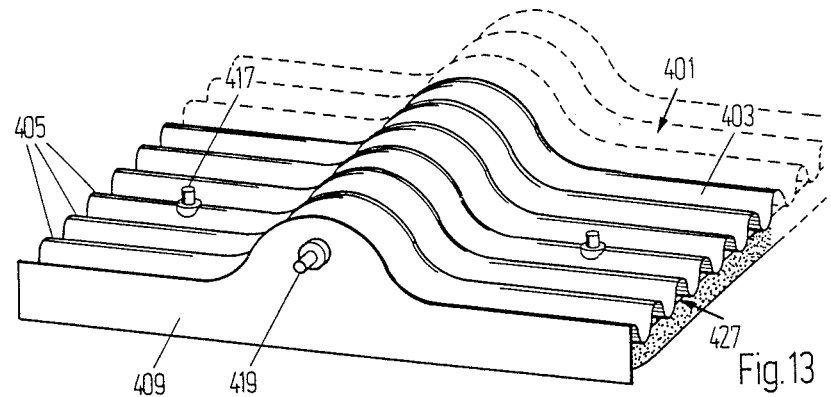
Figure 14:
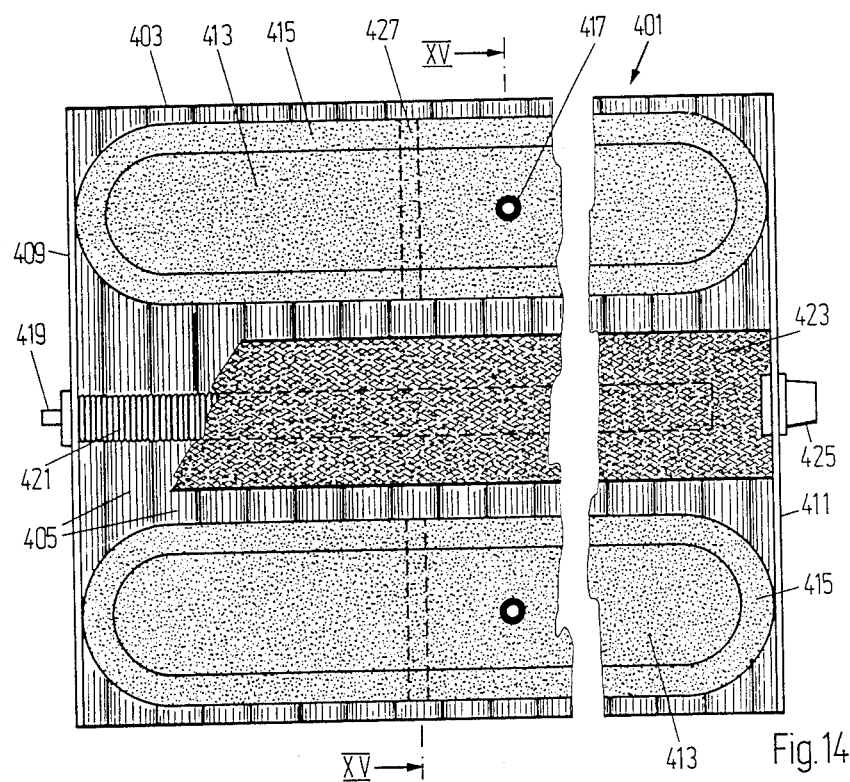
Figure 15:
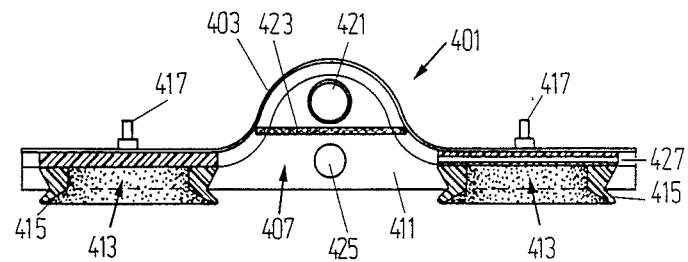
Figure 16:
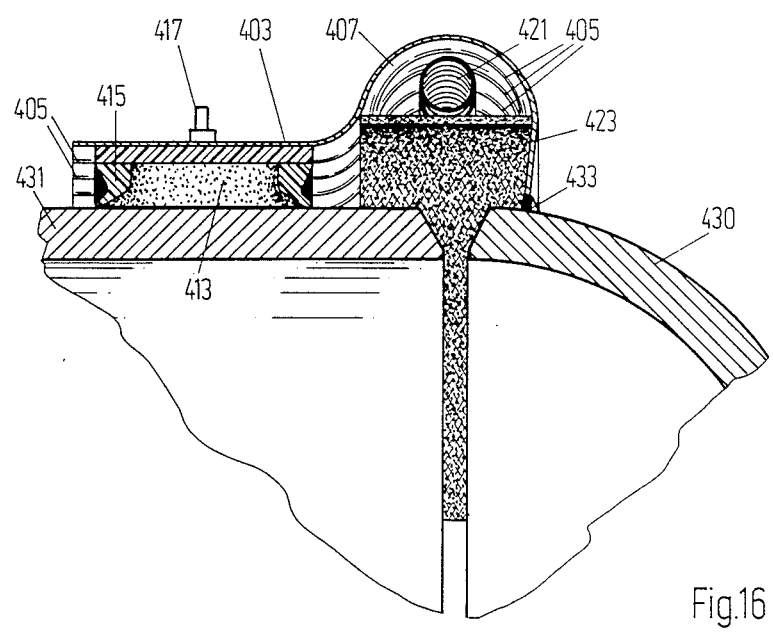

The embodiments of the invention will be described in what follows in some detail while having reference to the drawing where FIG. 1 shows a first embodiment of the hindgas device according to the invention seen from below, FIG. 2 shows the same as FIG. 1 but seen from above, FIG. 3 hows a section along the line III—III in FIG. 2, FIG. 4 shows a cross section through a second embodiment of the hindgas device according to the invention, FIG. 5 shows a third embodiment of the invention seen in perspective, FIG. 6 shows a part of a fourth embodiment of the device according to the invention seen from below, FIG. 7 shows the same as FIG. 6 but seen from the side, FIG. 8 shows a shape or profile for use as a cavity member in the device according to the invention seen from the end, FIG. 9 shows a shape or profile for use as a side part in the according to the invention seen from the end, FIG. 10 shows a section through a fifth embodiment of the invention, FIG. 11 shows a section through a sixth embodiment of the invention, FIG. 12 shows a cavity member and a side part in assembled state and showing permissible mutual angular movements, FIG. 13 shows a cut of a seventh embodiment of the device according to the invention seen in perspective, FIG. 14 shows the same as in FIG. 13 but seen from below, FIG. 15 shows a section on the line XV-XV in FIG. 14, and FIG. 16 shows an eighth embodiment of the invention placed on a work piece to be welded and seen in section.

A first embodiment of the device according to the invention and intended for fixation and hindgas coverage when welding two plane plates together which plates are mutually at a right angle with repsect to each other consists of two triangular end pieces 3 between which three parallel pieces of plate 5, 7 are extending. The apparatus is provided with sealing strips 9 and 10, preferably of silicone rubber or other heat resistant sealing material, and in part the strips 9 confine two vacuum chambers 11 and 13 and in part the strips 9,10 confine the space for hindgas coverage 15.

Feeding of protective gas may take place via a pipe branch 17 that leads to a distribution space 18. The distribution space 18 stretches over most of the length of the device and its side facing the space 15 has been worked out as a diffusor 19 consisting of stainless sinter metal, i.e. chips or shavings of stainless steel that have been pressed together to a coherent porous mass. The diffusor 19 might possibly also be made as a finely meshed wire netting or wire gauze. The other sides and the end walls are solid and cannot be penetrated by gas.

Atmospheric air and protective gas are conducted out from the space via openings 21 that on the outside open up into diffusors 23. In order to be able to create a sub-pressure in the chambers 11 and 13 there are pipe branches 25 for connection to a vacuum pump and the like.

When using the apparatus two plate-shaped work pieces are placed along the sealing means 9 and 10 in such a way the that plates meet at the point 27 of the right angle of the triangular end pieces 3. The chambers 11 and 13 formed thereby between the apparatus and the top side of the work pieces are now emptied of air via the pipe branches 25. Hereby are the plates kept in their positions as the sealing means 9 are pressed flat and the protruding ends of the work pieces are guiding against the edges 29 of the apparatus. Before the welding the space 15 is flushed with protective gas, e.g. 30 liters of argon per minute for one and a half to two minutes. After that the welding is performed while the flow of argon is reduced to a lesser constant value.

Clearly it is also possible according to the invention to use other types of protective gas, e.g. the above mentioned nitrogen based protective gas mixture.

In FIG. 4 there is seen a similar hindgas device in an other embodiment of the invention for the welding together of substantially plane plates in a butt weld (a weld of facing ends) and where the work pieces both are lying in the same plane where plane parallel pieces of plate 105, 107 stretch between end pieces 103. Apart from the geometry the construction is entirely the same as in the first embodiment, i.e. with sealing means 109, vacuum chambers 111 and 113, space 115 for hindgas coverage, feeding pipe branch 117, distribution chamber 118, diffusor 119 and suction pipe branch 125. In this embodiment the protective gas is also fed at the middle of the top side as in the example shown while the withdrawal may take place through openings 121 in the end pieces 103.

In a third embodiment shown in FIG. 5 the hindgas device according to the invention is built up substantially as in FIG. 4 with the exception of a modified end piece 204 and where in continuation of the sealing means 109 closest to the space 115 there are placed sealing means 209 on the end piece 204. Correspondingly, the diffusor 119 has a continuing part 219 in plane with or parallel to the end piece 204. An outlet opening 221 for gases is placed in the end piece 204. Thereby there is formed a space 215 for flow of protective gas at a right angle to the space 115 and thereby it is possible to achieve hindgas coverage all the way up to an inside rectangular corner, e.g. in a T-joint in a rectangular vessel. Other embodiments of the hindgas device according to the invention are possible as a matter of course depending on the angles of contemplated assembly of plates and the shape of the plates.

For use when welding circular seams, e.g. around flange sockets, the hindgas device according to invention may be designed as shown in FIG. 6 and 7. A circular space 250 may be fed with protective gas via a pipe branch 252. Two circular, concentrically placed sealing strips 254 and 256 form in between them a vacuum chamber 258. The air in the chamber 258 may sucked out via a pipe branch 260.

When applicating the hindgas device according to the invention for use in connection with linear welded seams it is preferred to build up the device of modular members as shown in FIG. 8 and FIG. 9. A cavity member 301 as shown in FIG. 8 and a side part 314 as shown in FIG. 9 are manufactured by extrusion of e.g. an aluminium alloy and may, as shown in the following, be used for construction of different hindgas devices. The cavity member 301 has a hollow 310, two symmetrically placed slits 311 and two symmetrically placed bracket-like, C-shaped projections 312. The side part 314 consists of a plane web 320 provided with two pairs of flaps 321 having saw-toothed projections 322 directed towards the web 320. The web 320 is further having two bracket-like, C-shaped projections 323 having an inside diameter corresponding to the outer diameter of the projections 312. One of the projections 323 is attached to the end of a flange 324 and the projection 323 is attached directly to the web 320 with the opening of the C slightly inclining to the flange 324.

The embodiment shown in FIG. 10 is a hindgas device for use when welding two plates placed at a right angle to each other. In this case the cavity member 301 with its projection 312 has been inserted into the projections 323 on the side parts 314. The member 301 and the part 314 are fastened by means of screws 330 to the end plates 331 of which only one is shown in the figure. In the major projection 323 bushes 332 made of plastics are placed at the ends in order to secure the screws 330. In the slits 311 there has been inserted a diffusor member in the form of sinter metal plate 333 so as to close off the hollow 310. A pipe branch 334 for the feeding of protective gas when welding is placed in the end plate 331. Discharge of gas may take place through a pipe branch with diffusor, the pipe branch being in the opposite end plate not shown. Between each pairs of flaps 321 there has been placed a sealing strip 335 made of temperature resistant material that e.g. may be silicone rubber or a special rubber intended for temperatures up to 260° C. At the end plates 331, the sealing strip 335 is passed around in order to form a vacuum chamber 336, the end parts 337 of facing flaps 321 having been bent out in order to allow the passing around of the sealing strip 335. A pipe branch 339 permits the connection of the chamber 336 to a source of vacuum. The very edges 338 of the end plates 331 may as shown not be covered, or, in other embodiments, be provided with sealings strips of the lip type or similar in order to prevent the intrusion of atmospheric air. Sealing of the edges 338 may be carried out after positioning the hindgas device against the work pieces to be welded simply by placing a strip of adhesive tape between the edge 338 and the work piece to be welded.

In a further preferred embodiment of the hindgas device according to the invention for use in connection with joints where the work pieces to be welded are lying in plane with each other or form a small angle deviating from a plane is shown in FIG. 11 where the other projection 323 at the of the flange 324 on the side part 314 has been pushed together with the projection 312 on the cavity member 301. As shown in FIG. 12 the shape and dimensions of the projections 312 and 323 allow a certain mutual mobility between the member 301 and the part 314. This is utilized in this embodiment as one end plate 340 in this case is provided with several holes 341 that allow the positioning of the side part 314 at an angle with respect to the cavity member 301 and what corresponds thereto with respect to the other side part 314. Thereby it is possible to weld plates together, the plates together forming a small angle with respect to a plane, or major cylindrical pieces of work can be welded together along their cylinder axis, e.g. the shell of a vessel. As shown in FIG. 11 the feeding of hindgas may take place at a pipe branch 342 on top of the member 301.

Under certain circumstances, e.g. when welding plates of relatively great plate thicknesses, the sealing strips 335 may be exposed to excessive temperatures. In order to avoid this the hindgas devices may as shown in FIG. 10 and 11 be provided with heat absorbing means like copper bars 350 as implied by dotted lines. As shown in FIG. 10 the bars may be mutually secured by means of transverse rods 351 between the bars 350. As shown in FIG. 11 a leaf spring member 352 may be placed between the bar 350 and the web 320 of the side part 314; thereby the copper bar 350 may be pressed down against the work piece, the welding heat in the work piece being absorbed in the copper bar 350.

In a further modification of the embodiment shown in FIG. 11 the web 320 of the side part 314 may be provided with air-escape holes 354 near by the flange 324 and between the flaps 321 and the projection 323. Thereby pockets of remaining air can be avoided in the corner between the flaps 321 and the web 321. The holes 354 are covered by sinter metal to the even discharge of gas and are placed at regular intervals in the longitudinal direction of the part 314.

A further preferred embodiment of the hindgas device according to the invention and intended for use in the hindgas coverage of welded seams running on curved surfaces, e.g. in the case of welding together of pieces of pipe or tube or of shells of a vessel across the cylinder axis of the shell is shown in FIG. 13-15. In this embodiment the hindgas device 401 is built up of a web 403 consisting of a relatively thin band of steel or plate of steel, preferably stainless steel, in which there has been pressed a succession of parallel waves 405. After the waves 405 have been given their form the web 403 is thereafter subjected to the forming of an arch 407 in the middle. The arch 407 extends in the whole length of the device and across the waves 405. The waves 405 and the arch 407 are preferably but not necessarily directed mutually at right angles. The web 403 is provided with two end pieces 409 and 411 and with vacuum chambers 413 formed by the sealing strips 415. Attaching the strips 415 to the web 403 in such a way that no holes appear between waves 405 and strips 415 can be brought about by pasting fluent silicone rubber between strips 415 and web 403, the fluent rubber paste eventually hardening to a solid elastic mass 416. On the web 403 above the chambers 413 there has been placed connections 417 for sucking off the air in the chambers 413.

The feeding of the protective gas to the device 401 may take place via a pipe branch 419 in the end piece 409 via one or more diffusor members 421, 423. The member 421 is made as a hose of spirally wound metal strips corresponding to the known reinforcement hoses for e.g. electric cables. Owing to the pressure loss through the hose 421 the flow of protective gas to the space below the arch 407 is greatest near the pipe branch 419 where a kind of flushing effect may achieved when the main outlet for the protective gas and remaining atmospheric air is placed at the other end piece 411, compare the below mentioned subject matter. In order to supplement the spreading effect of the hose 421 it is preferred that an other diffusor member in the form of a sinter metal netting 423 is stretched below the the hose 421. The sinter metal netting 423 is flexible and permits at the same time a slow oozing through of a gas. Discharge of protective gas may take place at a diffusor 425 in the opposite end piece 411, possibly supplemented with pipe shaped openings 427 through the silicone mass below the crests 405 of the waves and between the sealing strips 415 and the web 403. It is preferred that the openings 427 are distributed at intervals of approximately 30 centimeters along the side edge of the web 403.

A further embodiment for use in connection with the hindgas device for use in connection with curved welded seams is seen in FIG. 16. This version is in principle the same as the version shown in FIG. 13-15 though one of the chambers 413 has been removed and the web 403 brought down to the surface of the work piece 430 to be welded. This embodiment is especially suited for the welding on of the curved end piece 430 on the shell 431 of pressure vessels. In order to prevent contamination with atmospheric air around the point of weld may the lowest edge of the web 403 that is bearing against the work piece 430 be provided with a sealing means 433.

The different individual elements and constructive details in the embodiments described hereinabove may as a matter of course be combined in other ways than those indicated hereinabove without departing from the scope of the invention. Furthermore, the invention may as a matter of course be varied in other ways than described above within the scope of the patent claims.

I claim:

1. A device for isolation of introduced gas in arc welding in which the root or back side of a welded seam is isolated from atmospheric air by placing the device on the side of the root, which device includes walls that together with the surface of the work piece to be welded or the work pieces to be welded form a substantially closed enclosure enclosing the root of the welded seam and in which a protective gas is conducted through the enclosure during the welding process, characterized in that the device is held against the work piece to be welded by creating a vacuum in one or more chambers in the device, which chambers include a surface of the work piece to be welded for one side and the walls of the chamber for the other sides, and which enclosure includes feed openings for protective gas, further characterized in that the walls have means permitting connection to a source of vacuum, said vacuum chamber being provided with sealing means that may bear against the surface of work piece to be welded, each said vacuum chamber and said enclosure having sealing means in common forming a boundary between said vacuum chamber and said enclosure.

2. Device according to claim 1, characterized in that two chambers, one on each side, are situated along the space for flow of protective gas and where the sealing means for each chamber are placed on the inside of the walls of the chamber, the edges of said walls being being suited for guiding the work pieces facing the edges.

3. Device according to claim 2, characterized in that the space for the flow of protective gas and the chamber or chambers provided with sealing means have a common abutting surface intended for the work pieces to be welded, the abutting surface having the shape of a plane and that in conjunction with the space at its end there is provided an other space for a flow of protective gas having separate sealing means that join the other sealing means which other space with its sealing means has a abutting surface extending substantially in a direction at an angle with respect to the first abutting surface.

4. Device according to claim 3, characterized in that the device has a web comprising at least a first part intended for use as a vacuum chamber and a second part intended for a flow of protective gas, which first and second parts are mutually connected along facing lateral edges.

5. Device according to claim 2, characterized in that the device has a web comprising at least a first part intended for use as a vacuum chamber and a second part intended for a flow of protective gas, which first and second parts are mutually connected along facing lateral edges.

6. Device according to claim 2, characterized in that the space intended for flow of protective gas is provided with a diffusor consisting of one or more diffusor members through which the protective gas may be forced when feeding protective gas to the root of the seam, which diffusor extends substantially over the whole length of the device.

7. Device according to claim 6, characterized in that a diffusor member consists of a porous element stretching across the space for flow of protective gas.

8. Device according to claim 6, characterized in that a diffusor member consists of a hose-like duct made up of spirally wound metal strips.

9. Device according to claim 1, characterized in that the space for the flow of protective gas and the chamber or chambers provided with sealing means have a common abutting surface intended for the work pieces to be welded, the abutting surface having the shape of a plane and that in conjunction with the space at its end there is provided an other space for a flow of protective gas having separate sealing means that join the other sealing means which other space with its sealing means has a abutting surface extending substantially in a direction at an angle with respect to the first abutting surface.

10. Device according to claim 9, characterized in that the device has a web comprising at least a first part intended for use as a vacuum chamber and a second part intended for a flow of protective gas, which first and second parts are mutually connected along facing lateral edges.

11. Device according to claim 9, characterized in that the space intended for flow of protective gas is provided with a diffusor consisting of one or more diffusor members through which the protective gas may be forced when feeding protective gas to the root of the seam, which diffusor extends substantially over the whole length of the device.

12. Device according to claim 11, characterized in that a diffusor member consists of a porous element stretching across the space for flow of protective gas.

13. Device according to claim 11, characterized in that a diffusor member consists of a hose-like duct made up of spirally wound metal strips.

14. Device according to claim 1, characterized in that the device has a web comprising at least a first part intended for use as a vacuum chamber and a second part intended for a flow of protective gas, which first and second parts are mutually connected along facing lateral edges;

15. Device according to claim 14, characterized in that the mutual connection between the first and the second part in the web comprises an in part cylindrical hollow provided with a slit and an in part cylindrical outer surface on each part respectively and of substantially the same cylinder diameter where the cylinder axes of the hollow and the outer surface extend in parallel with the lateral edges.

16. Device according to claim 15, characterized in that it is the first part being provided with a in part cylindrical hollow along each of two of its lateral edges and where the outer openings of the slits of the hollows are facing in different directions.

17. Device according to claim 16, characterized in that the space intended for flow of protective gas is provided with a diffusor consisting of one or more diffusor members through which the protective gas may be forced when feeding protective gas to the root of the seam, which diffusor extends substantially over the whole length of the device.

18. Device according to claim 17, characterized in that a diffusor member consists of a porous element stretching across the space for flow of protective gas.

19. Device according to claim 17, characterized in that a diffusor member consists of a hose-like duct made up of spirally wound metal strips.

20. Device according to claim 1, characterized in that the space intended for flow of protective gas is provided with a diffusor consisting of one or more diffusor members through which the protective gas may be forced when feeding protective gas to the root of the seam, which diffusor extends substantially over the whole length of the device.

21. Device according to claim 20, characterized in that a diffusor member consists of a porous element stretching across the space for flow of protective gas.

22. Device according to claim 20, characterized in that a diffusor member consists of a hose-like duct made up of spirally wound metal strips.

23. Device according to claim 14, characterized in that the space intended for flow of protective gas is provided with a diffusor consisting of one or more diffusor members through which the protective gas may be forced when feeding protective gas to the root of the seam, which diffuser extends substantially over the whole length of the device.

24. Device according to claim 23, characterized in that diffusor member consists of a porous element stretching across the space for flow of protective gas.

25. Device according to claim 23, characterized in that a diffusor member consists of a hose-like duct made up of spirally wound metal strips.

26. Device according to claim 11, characterized in that it comprises an elongated piece of plate provided with waves running in parallel across its longitudinal axis and furnished with an arch extending in the longitudinal direction of the piece, the arch extending away from the side of the device intended for bearing against the work piece to be welded and below which arch the space for flow of protective gas is provided, the non-arching part of the piece of plate being provided with one or more vacuum chambers placed in continuation af each other along the longitudinal axis of the device.

27. Device according to claim 26, characterized in that the space intended for flow of protective gas is provided with a diffusor consisting of one or more diffusor members through which the protective gas may be forced when feeding protective gas to the root of the seam, which diffusor extends substantially over the whole length of the device.

28. Device according to claim 27, characterized in that a diffusor member consists of a porous element stretching across the space for flow of protective gas.

29. Device according to claim 27, characterized in that a diffusor member consists of a hose-like duct made up of spirally wound metal strips.

30. Device according to claim 1, characterized in that the space intended for flow of protective gas is provided with a diffusor consisting of one or more diffusor members through which the protective gas may be forced when feeding protective gas to the root of the seam, which diffusor extends substantially over the whole length of the device.

31. Device according to claim 30, characterized in that a diffusor member consists of a porous element stretching across the space for flow of protective gas.

32. Device according to claim 30, characterized in that a diffusor member consists of a hose-like duct made up of spirally wound metal strips.

* * * * *